Figure 1:
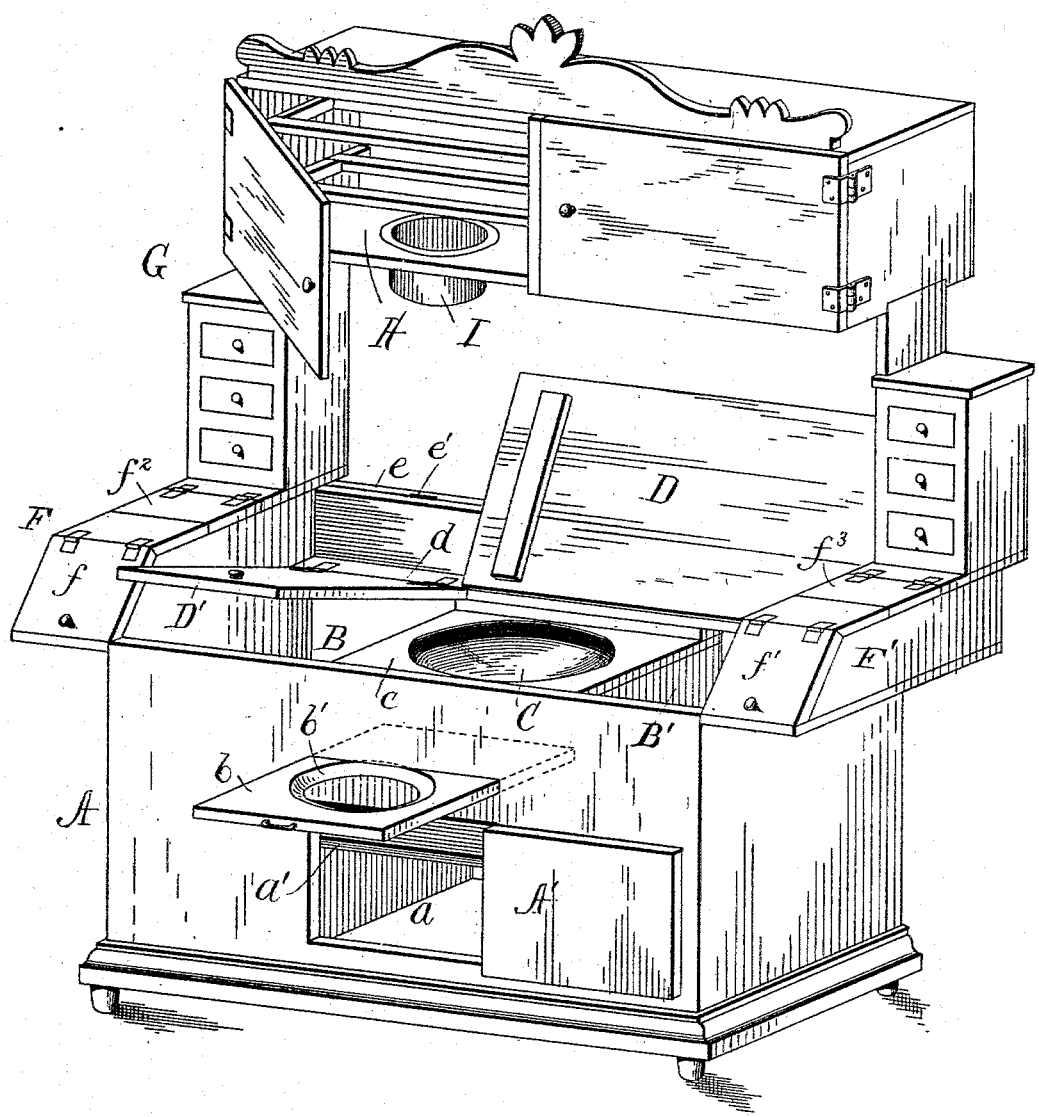

(No Model.)　　　P. B. THOMPSON.　　　2 Sheets—Sheet 1.
KITCHEN CABINET.

No. 511,176.　　　Patented Dec. 19, 1893.

Witnesses
T. W. Johnson
Horace T. Beall

Philip B. Thompson
Inventor
by
Attorney

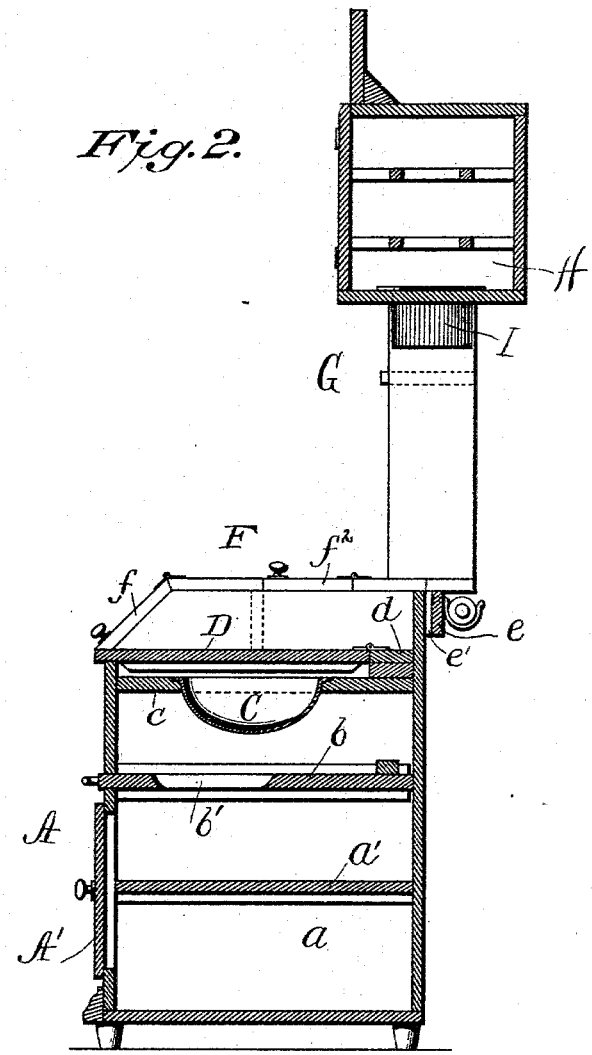

UNITED STATES PATENT OFFICE.

PHILIP B. THOMPSON, OF TROY, INDIANA, ASSIGNOR OF ONE-HALF TO THEODORE T. GAESSER, OF SAME PLACE.

KITCHEN-CABINET.

SPECIFICATION forming part of Letters Patent No. 511,176, dated December 19, 1893.

Application filed July 14, 1892. Serial No. 440,042. (No model.)

*To all whom it may concern:*

Be it known that I, PHILIP B. THOMPSON, a citizen of the United States of America, residing at Troy, in the county of Perry and State of Indiana, have invented certain new and useful Improvements in Kitchen-Cabinets; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in kitchen cabinets.

The object of the invention is to provide a convenient article of furniture for domestic use in kitchens; said cabinet being provided with a flour and a meal chest, and with a central compartment adapted to receive miscellaneous articles, above which are a support for a mixing pan and an intermediate sliding shelf having an aperture to receive pots and kettles; such a device having upper side compartments with doors and a superstructure on each side of which is a series of drawers while the upper transverse portion is adapted to receive a support for a vessel for generating steam, above which vessel is a shelf for receiving dough, as will be hereinafter fully set forth, and particularly pointed out in the claim.

In the accompanying drawings: Figure 1 is a perspective view of a kitchen cabinet constructed in accordance with my invention. Fig. 2 is a vertical sectional view.

A designates the base or lower portion of the structure, which is provided at its central lower portion with a compartment $a$ divided by a shelf $a'$ into upper and lower sections, a swinging door A' closing the compartment, which is adapted for general storage purposes. Above this central compartment the frame supports a sliding shelf $b$, the outward movement of which is limited by suitable stops, and this sliding shelf has an aperture $b'$ which is adapted to receive pots, kettles or pans which are placed thereon when the shelf is pulled out.

To the top of the vertical side walls of the compartment $a$ is secured a cover or top $c$, which is also apertured to receive a mixing pan C, which is adapted to rest upon the rim of the aperture.

On each side of the central compartment are bins B and B' one of which is intended to receive meal while the other contains flour, the flour bin being of larger capacity than the meal bin. To the rear transverse strip $d$ are hinged covers D and D', which when lowered cover the compartments in the base of the structure and form a flat top. The rear wall of the base A of the structure extends above the strip $d$, and to the rear side of this wall at the upper edge thereof is secured a strip $e$ having spaces $e'$ at intervals through which the blades of knives or other cutting implements may be passed and held in a convenient position.

F and F' designate side compartments, which are divided by vertical walls and have swinging doors $f$ and $f'$ which are inclined to form receptacles for sugar and salt, and in rear of these receptacles are hinged covers $f^2$ and $f^3$, which cover compartments adapted to receive spices and brown sugar.

The side pieces of the superstructure G have a vertical series of drawers as shown which are adapted to receive miscellaneous articles, and the upper portion of the superstructure has two outwardly swinging doors, one of which is adapted to cover a dough raising compartment H which is provided with a series of slats and an apertured bottom adapted to support a steam generating vessel I; in which vessel are adapted to be placed water and blocks of heated metal for heating the water to generate steam. Adjacent to the dough raising chamber is a cupboard having shelves.

Rear of the vertical strips $e$ may be secured hooks adapted to support a rolling pin, and additional hooks may be provided for hanging other articles thereon.

The device described forms a convenient article of kitchen furniture and means for raising dough.

I am aware that prior to my invention it has been proposed to provide a water receptacle for heating dough adapted to be heated by a lamp; also that it is not broadly new to provide flour chests having a rear upper compartment and bins in the lower portion or base, and I do not claim such construction broadly; but

What I claim as new, and desire to secure by Letters Patent, is—

An article of kitchen furniture, comprising a cabinet A having bins B and B', with covers, an intermediate cupboard $a$, mixing pan C and side compartments F and F' which project beyond the sides of the cabinet, a superstructure G supported upon the side compartments and having side receptacles and an upper receptacle, the upper receptacle projecting beyond the rear wall of the cabinet A, and a strip $e$ secured on the rear side of the rear wall of the cabinet at the upper edge thereof, said strip supporting hooks to receive a dough roller and having recesses which are adapted to receive such implements as knives and forks, substantially as shown and for the purpose set forth.

In testimony whereof I affix my signature in presence of two witnesses.

PHILIP B. THOMPSON.

Witnesses:
   HENRY MASON,
   H. H. HORNBROOK.